United States Patent Office 2,703,319
Patented Mar. 1, 1955

2,703,319

MANUFACTURE OF WATER-INSOLUBLE MONOAZO-DYESTUFFS

Ernst Fischer, Offenbach am Main, Germany, assignor to Farbwerke Hoechst A. G., vormals Meister Lucius und Bruning, Frankfurt am Main Hochst, Germany, a company of Germany No Drawing. Application October 17, 1951, Serial No. 251,830

Claims priority, application Germany October 20, 1950

8 Claims. (Cl. 260—203)

The present invention relates to water-insoluble monoazodyestuffs to be used as pigment dyestuffs and to the process of preparing such dyestuffs.

More particularly, this invention relates to monoazo-dyestuffs of the general formula:

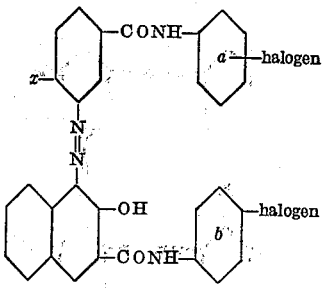

which dyestuffs do not contain any groups imparting solubility in water and in which $x$ represents a substituent of the group consisting of alkyl and alkoxy and the benzene residues $a$ and $b$ may contain further halogen atoms.

I have found that said dyestuffs can be made by coupling the diazo compound of an amine of the general formula

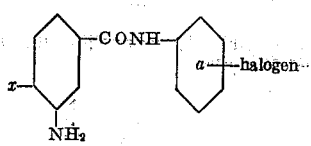

in which $x$ represents a substituent of the group consisting of alkyl and alkoxy, and the number of halogen atoms in the benzene residue $a$ may be greater than 1, with a 2:3-oxynaphthoic acid arylide of the general formula

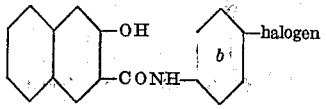

in which the benzene residue $b$ may contain further halogen atoms, and so choosing the components that they contain no groups imparting solubility in water, for example, sulphonic acid or carboxylic acid groups.

The new dyestuffs yield red to bluish-red tints having good fastness properties. They are especially suitable for coloring plastic masses composed of organic compounds of high molecular weight, for example, formaldehyde-urea, formaldehyde-phenol or formaldehyde-amine condensation products, polyvinyl compounds, rubber and the like, and can also be used for the production of dyestuff lakes which are fast to oil and light, and also, by addition to spinning solutions, for producing colored cellulose acetate and viscose artificial silk.

As compared with the monoazo-dyestuffs of comparable constitution described in German specification No. 602,064, which describes no dyestuff containing in the molecule the special distribution of halogen atoms characteristic of the present invention, the new dyestuffs are distinguished by a specific action, which consists in that they bleed into undyed vinyl chloride polymerization products considerably less than the aforesaid comparable dyestuffs.

The following examples illustrate the invention, the parts being by weight:

Example 1

15.6 parts of 1-amino-2-methoxybenzene-5-carboyl-1'-amino-2':4'-dichlorobenzene are diazotized in the usual manner. The suspension of the undissolved diazo-compound is then mixed with sodium acetate in order to eliminate the excess of mineral acid, and a solution of 14.9 parts of 1-(2':3'-oxynaphthoylamino)-4-chlorobenzene in a dilute solution of caustic soda is run in while stirring thoroughly. The coupling is completed by slowly heating the mixture to 40° C., and then the dyestuff formed is separated by filtration, washed well and dried. It is a red powder and has the following constitution:

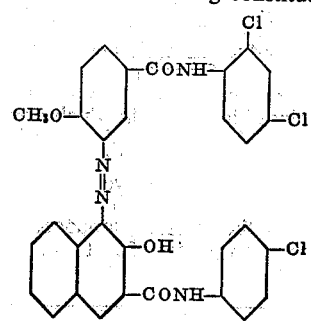

The dyestuff may be used for coloring a polymerization product of vinyl chloride in the following manner:

100 parts of a polymerization product of vinyl chloride
50 parts of phthalic acid di-n-butyl ester (acting as a softening agent)
0.3 part of titanium dioxide and
0.45 part of the azo-dyestuff are mixed together, and then the mixture is homogenized by means of kneading rollers for 10 minutes at 140° C. There is obtained a soft rubber-like mass having a bluish-red coloration, which does not bleed into the uncolored polymerization product and possesses a good fastness to light. Instead of, or in addition to, titanium dioxide there may be incorporated in the kneaded mass another filling material of the kind usual in working up rubber.

Example 2

13.1 parts of 1-amino-2-methyl-benzene-5-carboyl-1'-amino-4'-chlorobenzene are diazotized in the usual manner. After rendering the suspension of the diazo compound neutral to Congo with sodium acetate, there is stirred into the suspension a solution of 16.6 parts of 1-(2':3'-oxynaphthoylamino)-3:4-dichlorobenzene in a dilute solution of caustic soda, and then the whole is heated to 40° C. The resulting red dyestuff is separated by filtration, washed well and dried. It may be used in the following manner for coloring rubber.

2 per cent of the azo-dyestuff are worked by rolling into a mixture of rubber, filling material, sulphur and vulcanization accelerator. The mass is vulcanized hot in a press, and then has a red coloration which has good fastness to light and neither bleeds into white rubber nor bleeds out.

By immersing a mixture of rubber, an ordinary flux and 0.5 per cent of the azo-dyestuff in a solution of sulphur chloride in benzene, and vulcanizing in the cold there is obtained a colored mass having similar properties.

Example 3

A red dyestuff is produced from the diazo compound from 13.9 parts of 1-amino-2-methoxybenzene-5-carboyl-1'-amino-4'-chlorobenzene and 14.9 parts of 1-(2':3'-oxynaphthoylamino)-4-chlorobenzene in the manner described in Example 1 or 2. Lakes produced with the resulting dyestuff yield bluish-red tints having good fastness to oil and light.

The coupling may also be carried out in the presence of a carrier suitable for making dyestuff lakes.

Example 4

A dyestuff is prepared in the manner described in Example 1 from 14.8 parts of 1-amino-2-methylbenzene-5-carboyl-1'-amino-2':4'-dichlorobenzene and 16.6 parts of 1 - (2':3' - oxynaphthoyl - amino)-3:4-dichlorobenzene, and is a red powder which can be used for coloring in the manner illustrated in that example polymerization products of vinyl chloride in red tints which are fast to light, but which are more yellowish than those of the dyestuff described in Example 1. The color does not bleed into the undyed polymerization product.

Example 5

By using in Example 1, instead of 14.9 parts of 1-(2':3'-oxynaphthoylamino)-4-chlorobenzene, 18.4 parts of 1 - (2':3'-oxynaphthoylamino)-3:4:5-trichlorobenzene there is obtained a dyestuff yielding similar tints. 0.5 part of the resulting dyestuff is added to 100 parts of a condensation product of urea and formaldehyde which contains 30 per cent of wood meal as filling material, and the mixture is ground for 12 hours in a ball mill. The mass is then placed in a press in which pressing and hardening to form the desired shaped article is carried out in the course of 5 minutes at 140° C.

In the following table is given a number of further components which can be used in the present process, and also the color of the resulting monoazo-dyestuffs, which also possess good properties of fastness.

| Diazo-component | Azo-component | Tint |
|---|---|---|
| 1-Amino-2-methylbenzene-5-carboyl-1'-amino-4'-chlorobenzene. | 1-(2':3'-oxynaphthoyl-amino)-4-chlorobenzene. | red. |
| Do. | 1-(2':3'-oxynaphthoyl-amino)-4-bromobenzene. | Do. |
| 1-Amino-2-methylbenzene-5-carboyl-1'-amino-3':4'-dichlorobenzene. | 1-(2':3'-oxynaphthoyl-amino)-3:4-dichlorobenzene. | Do. |
| 1-Amino-2-methylbenzene-5-carboyl-1'-amino-2':5'-dichlorobenzene. | 1-(2':3'-oxynaphthoyl-amino)-4-chlorobenzene. | Do. |
| 1-Amino-2-ethoxybenzene-5-carboyl-1'-amino-4'-chlorobenzene. | ...do... | bluish-red. |
| 1-Amino-2-ethoxybenzene-5-carboyl-1'-amino-3':4'-dichlorobenzene. | 1-(2':3'-oxynaphthoyl-amino)-3:4-dichlorobenzene. | Do. |
| 1-Amino-2-methoxybenzene-5-carboyl-1'-amino-4'-bromobenzene. | 1-(2':3'-oxynaphthoyl-amino)-4-chlorobenzene. | Do. |
| 1-Amino-2-methoxybenzene-5-carboyl-1'-amino-2'-chlorobenzene. | ...do... | Do. |
| 1-Amino-2-methoxybenzene-5-carboyl-1'-amino-3'-chlorobenzene. | ...do... | Do. |
| 1-Amino-2-methoxybenzene-5-carboyl-1'-amino-3':4'-dichlorobenzene. | ...do... | Do. |
| 1-Amino-2-methoxybenzene-5-carboyl-1'-amino-3':4':5'-trichlorobenzene. | ...do... | Do. |
| 1-Amino-2-methoxybenzene-5-carboyl-1'-amino-4'-chlorobenzene. | 1-(2':3'-oxynaphthoyl-amino)-2:4-dichlorobenzene. | Do. |
| 1-Amino-2-methoxybenzene-5-carboyl-1'-amino-2':4'-dichlorobenzene. | 1-(2':3'-oxynaphthoyl-amino)-3:4-dichlorobenzene. | Do. |
| 1-Amino-2-methoxybenzene-5-carboyl-1'-amino-2':5'-dichlorobenzene. | ...do... | Do. |
| 1-Amino-2-methoxybenzene-5-carboyl-1'-amino-3':4'-dichlorobenzene. | ...do... | Do. |
| 1-Amino-2-methoxybenzene-5-carboyl-1'-amino-2':3':4'-trichlorobenzene. | 1-(2':3'-oxynaphthoyl-amino)-3:4-dichlorobenzene. | Do. |
| 1-Amino-2-methoxybenzene-5-carboyl-1'-amino-2':4':5'-trichlorobenzene. | ...do... | Do. |
| 1-Amino-2-methoxybenzene-5-carboyl-1'-amino-2':4'-dichlorobenzene. | 1-(2':3'-oxynaphthoyl)-2:3:4-trichlorobenzene. | Do. |
| 1-Amino-2-methoxybenzene-5-carboyl-1'-amino-2':5'-dichlorobenzene. | 1-(2':3'-oxynaphthoyl-amino)-2:4:5-trichlorobenzene. | Do. |
| Do. | 1-(2':3'-oxynaphthoyl-amino)-3:4:5-trichlorobenzene. | Do. |
| 1-Amino-2-methoxybenzene-5-carboyl-1'-amino-2':4':5'-trichlorobenzene. | ...do... | Do. |

I claim:
1. The water-insoluble monoazo-dyestuffs of the following general formula:

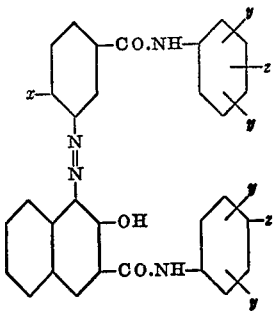

in which $x$ represents a substituent of the group consisting of alkyl and alkoxy, $y$ represents a substituent of the group consisting of hydrogen and chlorine and $z$ represents a substituent of the group consisting of chlorine and bromine.

2. The water-insoluble monoazo-dyestuffs of the following general formula:

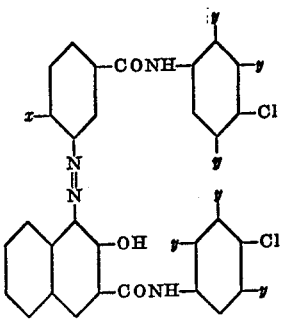

in which $x$ represents a substituent of the group consisting of methyl and methoxy and $y$ represents a substituent of the group consisting of hydrogen and chlorine, the number of chlorine atoms in each chlorine substituted benzene nucleus amounting to not more than three chlorine atoms.

3. The water-insoluble monoazo-dyestuffs of the following general formula:

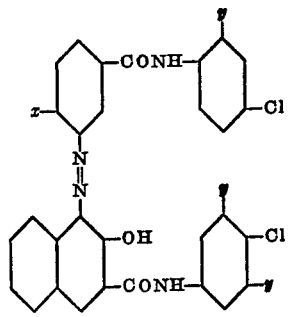

in which $x$ represents a substituent of the group consisting of methyl and methoxy and $y$ represents a substituent of the group consisting of hydrogen and chlorine.

4. The monoazo-dyestuff of the following formula:

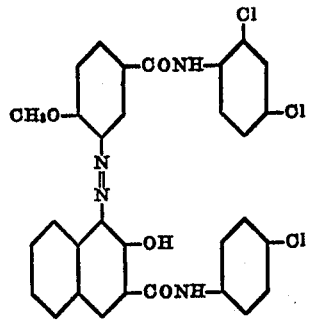

5. The monoazo-dyestuff of the following formula:
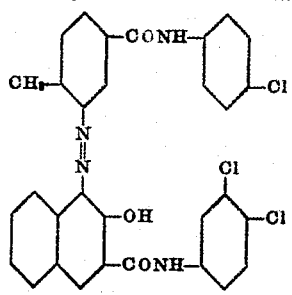
6. The monoazo-dyestuff of the following formula:
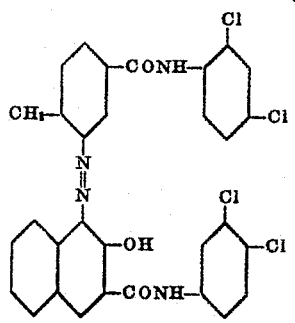
7. The monoazo-dyestuff of the following formula:
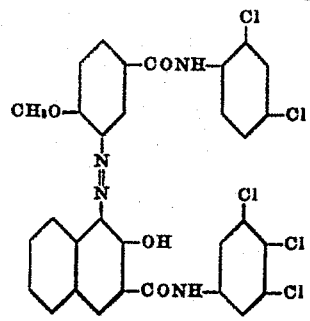
8. The monoazo-dyestuff of the following formula:
References Cited in the file of this patent
UNITED STATES PATENTS
| | | |
|---|---|---|
| 1,549,822 | Wagner | Aug. 18, 1925 |
| 1,872,035 | Grether et al. | Aug. 16, 1932 |
| 2,066,985 | Lamberz et al. | Jan. 5, 1937 |
FOREIGN PATENTS
| | | |
|---|---|---|
| 602,064 | Germany | Aug. 31, 1934 |
| 221,925 | Switzerland | Sept. 16, 1942 |